United States Patent Office 3,179,997
Patented Apr. 27, 1965

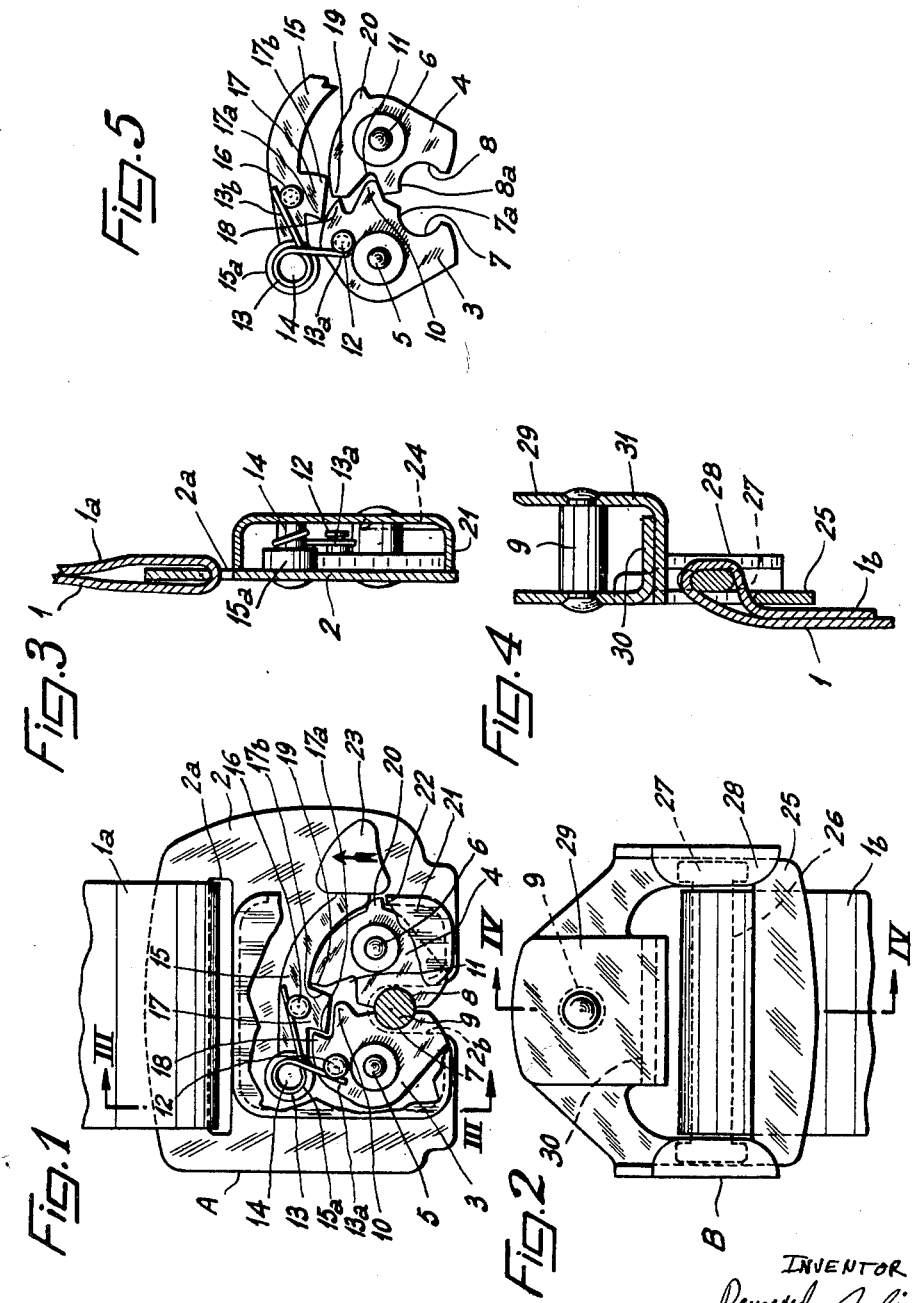

3,179,997
SEPARABLE FASTENER
Raymond Jalinaud, Paris, France, assignor to Societe des Agrafes Francaises et d'Articles Metalliques, Paris, France, a company of France
Filed Sept. 21, 1962, Ser. No. 225,214
Claims priority, application France, Oct. 4, 1961, 875,029
6 Claims. (Cl. 24—230)

The safety belts used to hold passengers in the seats of vehicles such as aircraft and motor vehicles must have a simple and robust locking device which can readily be operated by the user yet which can withstand considerable impact and forces without unfastening or being damaged. Also, it must be possible to release locking devices of this kind very rapidly and with very little force.

This invention has as its subject matter a locking device designed to meet all these requirements.

According to this invention, a locking device, more particularly for safety belts for vehicle passengers, comprising two rotatable and normally open jaws adapted to close upon a stud when the stud is introduced between the jaws, is characterised in that the jaws are retained in the closed position by a pivotally mounted lever which is biased resiliently towards the jaws and which is provided with surfaces which are of arcuate shape and which are centered on the pivoting axis of the lever.

The locking device mainly comprises a plate adapted to be secured to one end of a belt, two jaws which are resiliently biased open being pivoted side by side to the plate. Those surfaces of the jaws which face one another are formed with recesses adapted to co-operate with a stud carried by a buckle secured to the other end of the belt, the shape and positioning of the jaws being such that, when the buckle is moved towards the plate with some force and the stud is introduced between the jaws, the same close on the stud. Associated with the jaws is a lever which is resiliently biased towards them and which comprises a tooth engageable between the parts of the jaws when the same have closed upon the stud, to prevent the jaws from reopening. The tooth co-operates with the jaws through the agency of two arcuate bearing surfaces centered on the pivot axis of the lever. Consequently, the pressures applied to the tooth by the jaws when the belt is pulled to urge the ends of the belt apart, cancel each other without acting to an appreciable extent on the pivot of the lever; also, the lever is easy to operate even when the belt is in tension, since the only forces to be overcome are the resistances arising out of the friction between the jaws and the tooth.

The locking device has a number of robust components and is reliable in operation. Also, on opening, the jaws, as they are moved apart from one another by the means for biasing them open, thrust away the stud, so that the plate is separated from the buckle and the wearer is released immediately.

One embodiment of the invention is shown in the accompanying drawings, wherein:

FIG. 1 is an elevation, with parts removed, of the part of the device which carries the jaws and the lever, and showing the closed position;

FIG. 2 is an elevation of the part comprising the buckle and the stud;

FIG. 3 is a sectional elevation taken on the line III—III of FIG. 1;

FIG. 4 is a sectional elevation taken on the line IV—IV of FIG. 2; and

FIG. 5 is an elevation showing the open position of the jaws.

The locking device for a safety belt 1 has two complementary parts A and B attached, respectively, to the ends 1a and 1b of the belt 1. The part A comprises a plate 2 formed with a slot 2a near to one edge through which the looped end 1a of the belt extends. Near to that edge of the plate which is remote from the edge near which is the slot 2a, jaws 3, 4 are disposed and are pivoted to the plate on pivot pins 5, 6, respectively. The two jaws 3, 4 have nosepieces provided, in the surfaces which face one another, with recesses 7, 8 which, in the present example, are substantially semicircular. The jaws 3, 4 co-operate with a stud 9 which, whilst being shown in FIG. 1, is mounted on the part B. The position of the pivots 5 and 6 and the shape of the jaws 3, 4 are so devised that, when the jaws are open, as shown in FIG. 5, the stud 9 can readily be introduced between the jaws, but when the jaws are closed, as shown in FIG. 1, the stud 9 is firmly retained in the aperture bounded by the recesses 7 and 8. In the present example, the stud 9 is of circular cross-section, of the same radius as the recesses 7, 8, but both the stud and the recesses can have some other shape.

The plate 2 is formed with a slot 2b to allow the stud 9 to pass into the jaws 3, 4.

The jaw 3, on the part which is on the opposite side of the pivot 5 to the nosepiece, has a tooth 10 which extends towards the jaw 4, whilst the jaw 4 is formed, in a similar position, and opposite the tooth 10, with a notch 11 in which the tooth 10 can engage in the closed position of the jaws. The jaw 3 also is provided with a projecting pin 12 formed with a peripheral groove in which bears one end 13a of a torsion spring 13 for biasing the jaw 3 to the open position, and therefore, because of the interengagement of the tooth 10 and notch 11, also biasing the jaw 4 to the open position. The spring 13 is mounted on a pivot pin 14 secured to the plate 2, and pivotally mounted on the pin 14 is a locking lever 15 which also has a projecting pin 16 against which the other end 13b of the spring 13 bears, the spring 13 thus also resiliently biasing the lever 15 towards the jaws 3 and 4. That surface of the lever 15 which is adjacent the jaws 3 and 4 has a tooth 17 having side surfaces 17a, 17b which are of arcuate shape centered on the axis of the pivot 14. The width of the tooth 17 is such that, when the jaws 3, 4 are closed upon the stud 9 as shown in FIG. 1, the tooth 17 engages between surfaces 18 and 19 of the jaws 3, 4, respectively, which surfaces 18, 19 are appropriately shaped to bear against the surfaces 17a, 17b of the lever tooth 17.

To limit the closing movement of the jaws, the hub 15a of the lever 15 acts as a stop to be abutted by a surface of the jaw 3 during anticlockwise movement (FIG. 1) of said jaw 3, and the jaw 4 is provided with a tooth 20 which abuts, during clockwise movement (FIG. 1) of the jaw 4, a casing 21 secured to the plate 2 and covering the mechanism hereinbefore described. The casing 21 is provided with a slot 22 through which can pass the tooth 20 and the end of the lever 15 which terminates in a button 23. The casing 21 is provided with a slot 24, similar to and registering with the slot 2b in the plate 2, also to allow the stud 9 to pass into the jaws 3, 4. If desired, the pivots 5, 6 and 14 can extend through the casing 21 and be riveted thereto.

The part B of the locking device comprises a buckle 25 in which the looped end 1b of the belt 1 is adjustably secured, the belt extending around a transverse rod 26 which has widened ends 27 which slide and are guided in slideways 28 of the buckle (FIGS. 3 and 4). On the front of the buckle 25 is a yoke 29, the stud 9 being disposed between and riveted to the arms of the yoke 29. The separation between the arms of the yoke 29 is greater than the thickness of the part A. The yoke 29 can be formed by a tongue 30 cut out of the buckle 25 and bent over, together with a fitted right-angled member 31 which is secured to the tongue 30.

The locking device operates as follows:

The various elements of the part A are normally in the open position shown in FIG. 5. The locking lever 15 bears, by way of its tooth 17, against the adjacent surfaces of the jaws 3 and 4 which are kept open by the spring 13, the abutment by the lever 15 and the interengagement of the elements 10, 11 preventing the jaw 4 from wobbling.

To lock the belt, the part A is held in one hand and the part B in the other hand, and the part A is engaged in the yoke 29 so that the stud 9 enters the slots 2b and 24. The part A is pushed further into the yoke 29, and the stud 9 bears against heels 7a and 8a of the recesses 7, 8 and rotates the jaws 3, 4 in opposite directions. The recesses 7, 8 of the jaws close upon the stud 9, while the surfaces 18, 19 separate to allow the tooth 17 to pass therebetween, the tooth 17 being retained in position between the surfaces 18, 19 by the pressure of the spring 13. The mechanism is then in the closed position shown in FIG. 1.

When the two ends 1a and 1b of the belt 1 are pulled and urged away from each other, the stud 9 tends to open the jaws 3, 4, but the jaws abut, by way of their surfaces 18 and 19, against the surfaces 17a, 17b of the tooth 17. The abutting forces, which are operative on the tooth 17 through the surfaces 18, 19 to opposite hands, cancel each other, and so the pivot 14 of the lever 15 does not have to withstand any great reaction. The assembly is very robust. Nevertheless, since the surfaces 17a and 17b of the tooth 17 are centered on the axis of the pivot 14, the lever 15 can readily be operated in the direction of the arrow, marked on the button 23 of the lever 15, even when the belt is in tension, since the lever arm is relatively long and the only forces to be overcome are the frictional forces operative between the tooth 17 and the surfaces 18, 19. Once the tooth 17 has moved back far enough, the jaws 3 and 4 are opened abruptly by the spring 13, and return to the initial position illustrated in FIG. 5; the heels 7a, 8a of the recesses 7, 8 eject the stud 9 together with the part B, and unfastening of the belt is immediate.

What I claim and desire to secure by Letters Patent is:

1. A locking device, more particularly for use in safety belts for vehicle passengers, comprising in combination: a supporting plate; a pair of normally open jaws, rotatably mounted on said plate, interengaged with each other for rotary movement in opposite directions and arranged to close upon a stud when said stud is introduced between said jaws; a pivot-pin on said plate, a locking lever pivotally mounted on said pivot-pin for retaining said jaws in the closed position; and means for resiliently biassing said jaws to the open position and said locking lever toward said jaws, said locking lever being provided with surfaces which are of arcuate shape and concentric with the pivotal axis of the lever, said means comprising a two-armed spring mounted on said pivot-pin having one arm engaging and acting upon the lever and the other arm engaging and acting upon one of said jaws.

2. The combination of claim 1 wherein said lever includes a tooth carried thereon for introduction between said jaws for retaining the said jaws in the closed position, said arcuate jaw engaging surfaces being formed on said tooth.

3. The combination of claim 2 wherein said jaws have surfaces opposed to and matching the shape of said respective surfaces of said tooth.

4. A locking device, more particularly adapted for use in safety belts for vehicle passengers, comprising in combination a supporting plate, a pair of normally open jaws pivotally mounted on said supporting plate and having opposed locking arms adapted to close upon a stud when said stud is engaged between said arms and projections opposed to said locking arms arranged to move apart as said locking arms close on said stud; a locking lever mounted on said supporting plate for movement about a pivotal axis, means for resiliently biassing said lever toward said projections of said jaws; a tooth on said lever adapted to be introduced between said projections of said jaws when said jaws are closed upon said stud for retaining said jaws in closed position, said tooth being laterally defined by arcuate surfaces which are both concentric with the pivotal axis of said lever.

5. The combination of claim 4 wherein said projections are provided with surfaces laterally opposed to said surfaces of said tooth for locking engagement therewith.

6. The combination of claim 4 wherein said lever includes a hub by means of which it is pivotally mounted on the supporting plate, said hub being positioned to serve as a stop for the projection of said jaw.

References Cited by the Examiner

UNITED STATES PATENTS

| | | | |
|---|---|---|---|
| 1,514,781 | 11/24 | Muse | 294—83 |
| 2,559,999 | 7/51 | Regan | 24—241 |
| 2,722,449 | 11/55 | Harley | 294—83 |
| 2,789,468 | 4/57 | Burns | 294—83 |
| 2,873,137 | 2/59 | Conway | 294—83 |
| 2,970,796 | 2/61 | Ross | 24—230.1 |
| 2,977,149 | 3/61 | Burton | 294—83.1 |

FOREIGN PATENTS 665,600  11/48  Great Britain.

DONLEY J. STOCKING, *Primary Examiner.*

BERNARD A. GELAK, *Examiner.*